3,326,883
POLYOLEFIN PROCESS AND CATALYST
Joseph M. Kelley, Westfield, and Paul J. Marinaccio, Dumont, N.J., assignors to Rexall Drug and Chemical Company, Los Angeles, Calif., a corporation of Delaware
No Drawing. Filed Aug. 28, 1962, Ser. No. 220,082
6 Claims. (Cl. 260—94.9)

This invention relates to a process for polymerizing alpha olefins and more particularly relates to an improved process and catalyst for polymerizing alpha olefins by employing a transition metal halide in a valency state of at least one below its maximum state, hereinafter referred to as ("reduced valency") and treated in a manner to be described hereinbelow. The novel catalyst of this invention possesses unexpected activity in polymerization of α-olefins, and particularly ethylene, as will be demonstrated in the specific examples.

Italian Patent 526,101 discloses the polymerization of propylene by employing a catalyst such as titanium chloride in a valency state less than 4. The patent discloses that when a solid titanium compound, for example a powery titanium trichloride, suspended in a hydrocarbon solvent and heated to from 50 to 90° C. with triethyl aluminum is used to polymerize propylene, that the product is predominantly crystalline in nature. Many prior art publications in addition to Italian Patent 526,101 have demonstrated by examples the use of titanium trichloride as a catalyst component in the polymerization of α-olefins employing various processing techniques.

In the various prior art publication, for example British Patents 878,373 and 877,050 and Belgian 563,558, it has been demonstrated that titanium tetrachloride can be reduced to the trivalent form by several techniques which include:

(1) Heating aluminum with titanium tetrachloride and, after completion of the reaction, separating from the reaction product unreacted titanium tetrachloride and recovering a cystalline material comprising titanium trichloride;

(2) Reduction of transition metal halides, particularly titanium tetrachloride with metal alkyls such as aluminum triethyl in a diluent above 100° C.;

(3) Hydrogen reduction of tianium tetrachloride in the vapor phase; and (4) Reduction of titanium tetrachloride with titanium powder, etc.

In all of the foregoing techniques, the transition metal halide is obtained in a valency state of at least one below its maximum state (for example titanium tetrachloride is reduced to the titanium trichloride form).

Thus, according to known techniques for preparing titanium trichloride (or other transition metal halides) this catalyst component can be prepared cocrystallized with aluminum chloride corresponding to the formula TiCl$_3$·0.33AlCl$_3$ or as a solid purple TiCl$_3$ composition.

According to Australian patent specification 52,974/59, transition metal halides of Groups IV and VIII, for example titanium, zirconium, hafnium, thorium, uranium, vanadium, niobium, tantalum, chromium, molybdenum and tungsten, can also be prepared in a reduced valency state by the reduction of the vaporized transition metal halide at elevated temperatures in an atmosphere containing a vaporized metal compound such as aluminum trichloride and hydrogen. The reaction products are recovered and mixed in an inert solvent to form finely divided catalyst components having good activity for the polymerization of α-olefins when activated with organometallic compounds, particularly aluminum trialkyls.

In all of the foregoing techniques for perparing transition metal halides in a reduced valency state, particularly titanium trichloride whether it be cocrystallized with aluminum chloride or not, polymerization of alpha olefins with the transition metal halide promoted with an aluminum alkyl has resulted in catalyst activities wherein yields in the order of 500 to 800 pounds of polymer are produced per pound of titanium used in the catalyst. The process of this invention as will be illustrated provides an improved technique for polymerization of alpha olefins particularly ethylene, wherein unexpected catalyst activity is obtained so that one thousand or more pounds of ethylene polymer or more are produced per hour per pound of titanium used. Productivity of the catalyst results in several thousand pounds of polymer per pound of titanium.

It is an object of this invention to prepare a catalyst of increased activity, said catalyst being a transition metal halide in a reduced valency state promoted with an organoaluminum compound in a novel two-step process.

It is a further object of this invention to provide an improved process for polymerizing alpha olefins wherein highly active catalysts are employed and wherein high productivities of polymer per pound of transition metal used are obtained.

It is a specific object of this invention to provide a two-step method for pretreating a titanium trihalide catalyst component with an organoaluminum compound to increase its activity in polymerization of α-olefins.

A further specific object of this invention relates to the pretreatment of a titanium trichloride catalyst component to prepare a novel catalyst for use in the polymerization of α-olefins.

A more specific object of this invention is a two-step pretreatment of a titanium trichloride catalyst with an organoaluminum compound and its use in the polymerization of ethylene to obtain a polymer of high molecular weight.

In accordance with the foregoing objects of this invention a two-step process for preparing a novel polymerization catalyst and for polymerization of alpha olefins is herein provided wherein a transition metal halide in a reduced valency state is pretreated with an organoaluminum compound by suspending the transition metal halide in an inert solvent, contacting it with from 25 to 75% of the total organoaluminum compound to be employed in the polymerization at temperatures ranging from 50 to 70° C. for a short period of time, that is about 3 to 30 minutes, preferably cooling the reaction mixture resulting from said pretreatment step to a temperature below about 60° C. but above about 20° C. and adding thereto the additional organoaluminum compound to bring the total aluminum/transition metal halide ratio of the composite catalyst to about 1:1 to 5:1 but preferably 1:1 to 2:1. Reference will hereinafter be made to titanium trichloride as the transition metal halide although this should not be construed as limiting the scope of this invention. Likewise, reference will also be made hereinafter to the polymerization of ethylene unless otherwise noted.

The catalyst preferred in carrying out the improved process of this invention is a preformed titanium trichloride. Titanium trichloride per se such as that prepared by hydrogen reduction of TiCl$_4$ or cocrystallized with aluminum chloride is available commercially. The titanium trichloride cocrystallized with aluminum chloride available commercially has a nominal composition $$3TiCl_3 \cdot AlCl_3$$

although the molar ratio of these two components can vary. Other catalysts of varying ratios of TiCl$_3$ to AlCl$_3$ such as 5TiCl$_3$·AlCl$_3$ prepared by ball milling the two components together can also be employed in the process of this invention.

The titanium trichloride is pretreated in the first step in accordance with the process of this invention with an organoaluminum compound such as aluminum trialkyl wherein the alkyl groups can contain from 1 to 10 carbon atoms. Aluminum triethyl has been found to be particularly useful for this pretreatment. For the second or activation step, organoaluminum compounds of the general formula $AlR_3$, wherein R is an alkyl and $R_1R_2AlX$ can be used. In the compound $R_1R_2AlX$, $R_1$ and $R_2$ can be similar or dissimilar and each can represent a hydrogen atom or a hydrocarbon radical such as an alkyl, alkaryl, aryl, arlkyl, alkenyl, alkynyl, cycloalkyl or cycloalkenyl and X can represent a hydrogen atom, a halogen, an alkoxy or aryloxy group or the residue of a secondary amine or an amide, mercaptan, thiophenol, carboxylic acid or a sulphonic acid. The aluminum compound employed in the second step can also be represented by the general formula $RAlY_1Y_2$ and R can be the same as above while $Y_1$ and $Y_2$ can be similar or dissimilar and each can represent a halogen, an alkoxy or an aryloxy group.

In the polymerization step diluents for carrying out the polymerization (and/or catalyst pretreatment step) there can be employed normally saturated hydrocarbons, for example propane, butane, pentane, hexane, heptane and cycloaliphatics such as cyclopentane, cyclohexane and substituted cycloaliphatics as well as aromatics such as xylene and toluene. It has been found advantageous to carry out the polymerization process of this invention by the use of a normally gaseous inert diluent which under the conditions of the process is liquefied, such inert hydrocarbon diluents being represented by propane and butane. Moreover the specific monomers employed can also be used as their own diluents in the polymerization step simply by pressurizing the reactor to liquefy the constituents, for example propylene or butene-1. The process of this invention includes the step of carrying out the polymerization reaction in a heterogeneous liquid diluent composed for example of liquid propylene and liquid propane or liquid propylene and liquid heptane in various mol concentrations. It is preferred according to one embodiment of this invention to polymerize ethylene in liquid butane as will be illustrated hereinafter in the specific examples.

Any alpha olefin can be polymerized with the improved catalyst and process of this invention. Examplary of such olefins are ethylene, propylene, butylenes such as butene-1, pentenes such as pentene-1, hexenes such as hexene-1, heptenes, octenes, nonenes, decenes and the like. Mixtures of these wherein one is predominant over the other, for example ethylene-propylene or propylene-butene-1 can also be copolymerized to prepare random copolymers or ethylene-propylene rubbers or elastomers by varying the specific ratios of the two monomer components as known in the art. Block copolymers of various alpha olefins can be polymerized according to this technique, for example block copolymers of propylene on ethylene and vice versa or alternating copolymers such as polyethylene-polypropylene-polyethylene or block copolymers followed by random copolymers and followed by further block copolymer segments.

Polymerization temperatures are not critical and can vary considerably as known in the prior art. Where a slurry type or particle form polymer is desired polymerization temperatures can range from 60 to 120° C., preferably from 70 to 95° C. In an alternate process where the polymer is desired to be kept in solution temperatures of above 120° C. can be adequately employed. In such examples for instance using pentane as a diluent, if the polymerization is carried out above 120° C. the polymer formed dissolves in the diluent and is recovered as a solution from which it can thereafter be precipitated by cooling.

The pressures which can be most advantageously employed in the process of this invention are from atmospheric to about 175 pounds per square inch. It will be realized, however, that depending on the particular diluent used pressures can vary. Thus where a normally liquid hydrocarbon is used as the diluent, for example heptane, polymerizations can be carried out at pressures of from about atmosphere to below about 100 pounds per square inch while where either the monomer or a normally gaseous agent is used as the dispersing medium pressures at least as high as the liquefaction pressures are to be employed, for example propylene liquefies at 20° C. at a pressure of about 150 pounds per square inch.

The preferred process for polymerizing ethylene according to this invention can be adapted to a continuous or batch technique. In a continuous process suitable arrangements can be incorporated by provision of various units for the two-step catalyst pretreatment and activation followed by suitable unit arrangements for polymerization in a continuous manner. In a batch process catalyst can be prepared in situ by pretreating followed by activation and then addition of ethylene, etc.

It is not known why pretreatment of titanium trichloride with organoaluminum compounds results in a very active polymerization catalyst. If the components are not prereacted, however, the activity of the catalyst is low (in comparison to the treated catalyst). It is postulated that the pretreatment reduces the titanium from a trivalent stage to a lower valency state and the formation of a novel aluminum-titanium complex which thereby affects the reaction between the catalyst and the monomer. The particular complex resulting from the reaction obtained on pretreatment is believed to be new although it has not been isolated or identified chemically.

The first step catalyst component pretreatment conditions are quite specific and from 25% to 75% of an aluminum trialkyl based on total organoaluminum compound to be employed must be added to the titanium trichloride in a diluent at a temperature of from 50 to 70° C. but preferably at 60° C. and held at this temperature for from 3 to 30 minutes and preferably for about 5 minutes. The pretreatment step is followed preferably by cooling and the addition of the remainder of the aluminum compound, which in this step can differ in composition from the aluminum trialkyl used in the first step, required to produce a catalyst having an aluminum to titanium ratio of from about 1:1 to 5:1 and preferably 1:1 to 2:1. The remainder of the aluminum compound is preferably added at temperatures of 60° C. or below, for example from 20° to 40° C. As will be illustrated hereinafter catalyst efficiency is affected by the temperature at which the final aluminum compound addition is made.

The preferred catalyst for use in the polymerization of alpha olefins, specifically ethylene, is a cocrystallized $TiCl_3 \cdot AlCl_3$ pretreated in the first step with aluminum triethyl. For the second pretreatment step, in addition to aluminum trialkyls, other aluminum alkyls can be used, for example diethyl-aluminum monochloride or mixtures of other organoaluminum compounds. The preferred diluents for carrying out the process of this invention are butane and preferred pressures of from atmospheric to 175 pounds per square inch gauge and polymerization temperatures of from 70° to 95° C.

In order to further demonstrate this invention the following specific examples are presented for illustration purposes only.

In the examples presented below, the first step or pretreatment is carried out generally by adding from 25 to 75% of the aluminum triethyl to the titanium trichloride catalyst component in heptane at 60° C. and pretreated for five minutes at 60° C. while keeping the initial Al/Ti ratio at 0.50. The mixture is then preferably cooled and the second addition of aluminum compound is then made. The pretreated catalyst in varying concentrations in grams per liter and final Al/Ti ratios 1:1 to 5:1 is then employed in polymerization which can be carried out in heptane or butane at preferred temperatures of about 80° C. and pressures of about 175 p.s.i.g. The catalyst activity is determined by the following formula:

$$\text{Activity} = \frac{\text{Grams of polymer}}{\text{Grams of catalyst}} \times \text{reaction time in hours}$$

The reaction time used is one hour and the activity is based on the titanium metal present unless total catalyst is indicated.

Activity should not be confused with productivity. Productivity means the total amount of polymer produced per pound of titanium or, if specified, per pound of total catalyst. Productivities of at least 15,000 pounds of polymer per pound of titanium are realized by the process and catalyst of this invention. Productivities as high as 100,000 pounds of polyethylene polymer per pound of titanium can be produced if optimum and preferred conditions of reaction are employed.

In the examples to be presented herein it should therefore be understood that the activity is measured for a limited time, that is, one hour unless otherwise noted and this does not have reference to the capacity of the catalyst to produce polymer until its exhaustion.

*Example 1*

To 0.185 gram of TiCl$_3$·33AlCl$_3$, diluted with 10 ml. of heptane, is added at 60° C., 5 ml. of 0.094 molar aluminum triethyl. Reaction is carried out for five minutes. At the end of this time the slurry is cooled to 40° C. and 5 ml. of 0.094 mol aluminum triethyl is added. The catalyst slurry is then transferred to 500 ml. of heptane saturated with ethylene at 75° C. Polymerization is carried out for one hour at atmospheric pressure. A yield of 64.4 grams of polymer are obtained which corresponds to a catalyst activity based on titanium of 1440. The final Al/Ti ratio in this example is 1.0 and in the pretreatment the Al/Ti ratio is 0.50.

*Example 2*

The procedure of Example 1 is repeated except that the second addition of aluminum triethyl is increased in amount so that the final Al/Ti ratio is 2.0. The yield of ethylene polymer is 80 grams corresponding to a catalyst activity based on titanium of 1800.

*Example 3*

To 0.370 gram of TiCl$_3$·33AlCl$_3$ diluted with 25 ml. of heptane is added at 50° C. 25 ml. of 0.0748 molar aluminum triethyl. The slurry is reacted for five minutes and then transferred to 500 ml. of heptane saturated with ethylene at 75° C. and at atmospheric pressure. Polymerization is carried out for one hour and 43 grams of ethylene polymer are obtained. This yield corresponds to a catalyst activity of 970 based on titanium. This example demonstrates that the two-step pretreatment is necessary to obtain a high catalyst activity.

*Example 4*

To 0.144 gram of titanium trichloride which is prepared by reducing titanium tetrachloride with hydrogen, diluted with 15 ml. of heptane is added 2.5 ml. of 0.188 molar aluminum triethyl at 60° C. The slurry is heated for five minutes and then cooled to 40° C. An additional 7.5 ml. of 0.188 molar aluminum triethyl is then added and the catalyst mixture transferred to 500 ml. of heptane saturated with ethylene at 75° C. and at atmospheric pressure. Polymerization is carried out for one hour and 64.7 grams of polymer are produced which corresponds to an activity based on titanium of 1450. In this example in the first pretreatment step, the Al/Ti ratio is 0.50 while the final ratio is 2.0.

*Example 5*

To 0.185 gram of the titanium trichloride employed in Example 4 diluted with 15 ml. of heptane, there is added at room temperature 10 ml. of 0.188 molar aluminum triethyl. After five minutes the catalyst slurry is transferred to 500 ml. of heptane saturated with ethylene at 75° C. and polymerization carried out for one hour at atmospheric pressure. There is obtained 42 grams of polymer which corresponds to a catalyst activity of 950 based on titanium. In this example the Al/Ti ratio is 2.0. This example demonstrates that in order to obtain the high catalyst activity of this invention, it is necessary to pretreat the titanium trichloride as herein illustrated.

*Example 6*

To 0.185 gram TiCl$_3$·33AlCl$_3$ diluted with 6.3 ml. of heptane is added 2.5 ml. of 0.180 molar triethyl aluminum at 60° C. and kept at this temperature for five minutes. The mixture is then cooled to 40° C. and 7.5 ml. of 0.188 molar diethyl aluminum monochloride is added (Al/Ti ratio 2.0). The catalyst slurry is then added to 500 ml. of heptane saturated with propylene at 75° C. and atmospheric pressure. A predominantly isotactic content polymer is obtained with substantial catalyst activity.

In table I below are shown three runs illustrating reactions employing the procedure of Example 1 except that the temperature of the second step addition of aluminum triethyl is varied.

TABLE I

| Run No. | Temp. of Final Aluminum Tri-Ethyl Addition, °C. | Catalyst Efficiency | Polymerization Rate, lbs./hr./lb. of Total Catalyst |
|---|---|---|---|
| 1 | 30 | 1,260 | 191 |
| 2 | 40 | 1,440 | 219 |
| 3 | 60 | 1,010 | 153 |

The results above show a maximum catalyst activity when the second aluminum triethyl addition is carried out at 40° C.

In Table II below there is further illustrated results obtained when the initial Al/Ti ratio in the pretreat step is varied. In these runs the final Al/Ti ratio is maintained constant at 1.0 while the Al/Ti in the pretreat step is varied. 0.185 gram of TiCl$_3$·33AlCl$_3$ is used in each case and pretreatment with aluminum triethyl as hereinabove illustrated is carried out at 60° C. for five minutes.

The second aluminum triethyl addition is carried out at 40° C. (except run No. 7 where all the aluminum compound is added initially). Polymerization is carried out at 75° C. for one hour at atmospheric pressure.

TABLE II

| Run No. | Initial Al/Ti Ratio | Activity (Ti), lbs./lbs./hr. | Activity, Total Grams Catalyst, lbs./lbs./hr. |
|---|---|---|---|
| 4 | 0.2 | 1,170 | 178 |
| 5 | 0.5 | 1,440 | 214 |
| 6 | 0.7 | 950 | 144 |
| 7 | 1.0 | 970 | 147 |

From the above runs it can be seen that highest catalyst activity both on titanium and total catalyst is obtained for a pretreat Al/Ti ratio of 0.50. As the Al/Ti pretreat ratio approaches 1.0, the activity decreases somewhat.

In Table III below the pretreat conditions are maintained constant. In these runs 0.185 gram of TiCl$_3$·33AlCl$_3$ are pretreated so that the Al/Ti ratio of 0.50 is obtained at 60° C. for five minutes. The remaining aluminum triethyl is added at 40° C. and polymerization of ethylene carried out as before at atmospheric pressure.

TABLE III

| Run No. | Final Al/Ti | Activity (Ti), lbs./lbs./hr. | Activity, Total Grams Catalyst, lbs./lbs./hr. |
|---|---|---|---|
| 8 | 1.0 | 1,440 | 219 |
| 9 | 2.0 | 1,800 | 200 |
| 10 | 2.0 | 1,170 | 130 |
| 11 | 2.0 | 1,900 | 212 |
| 12 | 5.0 | 1,640 | 110 |
| 13 | 25.0 | 1,170 | 18.2 |

As seen from the above results the optimum activity based on titanium is obtained for an Al/Ti ratio of 2.0. The highest activity based on total grams of catalyst however, occurs at an Al/Ti ratio of 1.0. It will also be seen that increasing the Al/Ti ratio to 25.0 does not increase activity. In Run No. 10 the low results in activity (still higher than without pretreatment according to this invention) were due to impure solvent.

In Table IV below there is shown additional data relative to the process of this invention. Catalyst is prepared by using the two-step addition of aluminum triethyl as hereinbefore described. The pretreat concentration is varied by changing the amount of heptane used to slurry the $3TiCl_3 \cdot AlCl_3$. The required amount of aluminum triethyl is added as an 0.188 molar solution. Pretreatment is carried out for five minutes at 60° C. with an Al/Ti ratio of 0.50. Additional triethyl aluminum solution is added at 40° C. to give a final ratio of Al/Ti of 2.0. In all runs 0.185 gram of $3TiCl_3 \cdot AlCl_3$ is used. Polymerizations are carried out at 75° C. for one hour at atmospheric pressure.

TABLE IV

| Run No. | Pretreat Concentration, Total grams/liter | Activity (Ti), lbs./lbs./hr. | Activity, Total Grams Catalyst, lbs./lbs./hr. |
|---|---|---|---|
| 14 | 6.8 | 1,540 | 172 |
| 15 | 13.7 | 1,500 | 167 |
| 16 | 13.7 | 1,590 | 177 |
| 17 | 27.1 | 2,030 | 226 |
| 18 | 53.3 | 1,760 | 196 |

From the results above it can be seen that catalyst activity is dependent also on pretreat concentration, with higher concentrations giving greater activities. The best activity is seen to occur at a concentration of 27.1 grams/liter.

In experiments following the procedure of Example 1 it was found that the titanium trichloride responds best to pretreatment with an aluminum trialkyl and specifically where the alkyl groups contain from 1 to 10 carbon atoms.

In further experiments, however, wherein titanium trichloride was pretreated with triethyl aluminum for five minutes at 60° C. with an Al/Ti ratio of 0.5 it was found that if diethyl aluminum monochloride and aluminum triethyl are used in the second treating step, that is, added at 40° C. to bring the final Al/Ti ratio to 2.00, that catalyst activity based on titanium is 1450. Thus in addition to the use of diethyl aluminum monochloride, mixtures of this cocatalyst with aluminum triethyl can also be used.

In a further polymerization experiment as set forth in Example 1, with a final Al/Ti ratio of 2.00 but carried out for two hours, the catalyst activity based on titanium is 3700 pounds per pound of titanium.

In batch polymerization runs on a larger scale than illustrated in the foregoing examples, catalyst productivity is shown to be several thousand pounds of polyethylene per pound of titanium. The pretreatment of the catalyst is carried out substantially as in Example 1 except that additional aluminum triethyl is added to the butane diluent to neutralize catalyst poisons. This accounts for the high Al/Ti mol ratios.

TABLE V

| | Run No. | |
|---|---|---|
| | 1 | 2 |
| Temperature, °F | 170 | 172 |
| Pressure, p.s.i.g | 150 | 160 |
| Catalyst conc. gms./liter | 0.31 | 0.28 |
| Solvent | Butane | Butane |
| Residence time, hrs | 1.2 | 1.5 |
| Al/Ti mol ratio | 24/1.0 | 90/1.0 |
| Polymer production rate, lbs./hr | 44 | 42 |
| Yield, lbs. polymer/lb. of total catalyst | 427 | 442 |
| Yield, lbs. of polymer/lb. of titanium | 26,000 | 97,000 |

In the above runs pretreated catalyst according to this invention is added to a batch reactor containing butane as the diluent. The catalyst was pretreated in two steps as hereinbefore stated using heptane as diluent. The catalyst, $TiCl_3 \cdot 33AlCl_3$ was activated with aluminum triethyl in the first and second pretreatment steps and then added to a 100-gallon reactor. Because the butane diluent was pretreated with aluminum triethyl, as stated, to eliminate catalyst poisons, the final Al/Ti ratio is higher than in the smaller laboratory examples. In the batch runs noted, the catalyst was still active at the time the polymerization run was terminated. The activity of the catalyst was highest for those runs wherein the concentration of the catalyst was about 0.28 gram per liter. These runs demonstrate the unobvious productivity of a catalyst prepared and used according to the process of this invention.

In repeating the foregoing runs, but using hydrogen to lower molecular weight it was found that comparable productivities could be achieved over longer residence times.

Modifications falling within the scope of this invention can be made without departing from the coverage of the appended claims.

What is claimed is:

1. In a polymerization process which comprises treating a catalyst consisting of either a crystalline titanium trichloride or a cocrystallized titanium trichloride-aluminum chloride complex having the formula $3TiCl_3 \cdot AlCl_3$ with an organoaluminum compound and using the treated catalyst for the polymerization of an alpha olefin, the improvement which comprises pretreating said catalyst in the following steps:

(1) adding aluminum triethyl to said catalyst in an amount of about 25 to 75% by volume of the total organolaluminum compound required for a final aluminum/titanium metal ratio of about 1:1 to 5:1 in a diluent at a temperature of about 50° to 70° C. for a period of about 3 to 30 minutes to form a catalyst slurry, (2) adding to the catalyst slurry the remaining 75 to 25% by volume of the organoaluminum compound required to bring the total aluminum/titanium metal ratio of the catalyst to about 1:1 to 5:1 at a temperature of about 20° to 60° C.

and polymerizing said alpha olefin at a temperature of at least above 60° C. in the presence of said pretreated catalyst.

2. The process of claim 1 wherein said alpha olefin is ethylene and wherein the polymerization step is carried out in the presence of liquefied butane.

3. The process of claim 1 wherein said alpha olefin is propylene and wherein the polymerization step is carried out in the presence of liquefied butane.

4. The process of claim 1 wherein the organoaluminum compound used in step (2) consists of aluminum triethyl or diethyl aluminum chloride or mixtures thereof.

5. The process for preparing a catalyst for alpha olefin polymerization which comprises the step of pretreating a catalyst consisting of either a crystalline titanium trichloride or a cocrystallized titanium trichloride-aluminum chloride complex having the formula $3TiCl_3 \cdot AlCl_3$ with aluminum triethyl in an amount of about 25 to 75% by volume of the total organoaluminum compound required for a final aluminum/titanium metal ratio of about 1:1 to 5:1 at a temperature of about 50° to 70° C. for a period of about 3 to 30 minutes to form a catalyst slurry, and thereafter adding to said catalyst slurry additional organoaluminum compound consisting of aluminum triethyl or diethyl aluminum monochloride or mixtures thereof in a proportion to bring the total aluminum/titanium metal ratio of the catalyst to about 1:1 to 5:1 at a temperature of about 20° to 60° C.

6. The catalyst prepared according to the process of claim 5.

References Cited

UNITED STATES PATENTS

| | | | |
|---|---|---|---|
| 2,976,252 | 3/1961 | Leary et al. | 260—94.9 |
| 3,032,510 | 5/1962 | Tornquist | 260—94.9 |
| 3,051,690 | 8/1962 | Vandenberg | 260—88.2 |
| 3,058,963 | 10/1962 | Vandenberg | 260—94.9 |
| 3,063,798 | 11/1962 | Langer et al. | 260—94.9 |

FOREIGN PATENTS 844,864  8/1960  Great Britain.

JOSEPH L. SCHOFER, *Primary Examiner.*

MORRIS LIEBMAN, *Examiner.*

F. M. SIKORA, E. M. OLSTEIN, L. EDELMAN,
*Assistant Examiners.*